United States Patent [19]

Jackson

[11] 4,222,297
[45] Sep. 16, 1980

[54] ADAPTER CONSTRUCTION FOR ARBOR INSTALLATION OF TOOLING

[75] Inventor: Robert T. Jackson, Solon, Ohio

[73] Assignee: Northeastern, Incorporated, Canton, Ohio

[21] Appl. No.: 24,158

[22] Filed: Mar. 26, 1979

[51] Int. Cl.$^3$ .................... B23D 19/06; B23D 35/00
[52] U.S. Cl. .................................... 83/481; 51/168; 83/664; 83/665; 83/701
[58] Field of Search ............... 83/664, 665, 701, 481; 51/168

[56] References Cited

U.S. PATENT DOCUMENTS

| 2,335,334 | 11/1943 | Yoder | 72/129 |
| 3,800,648 | 4/1974 | Nishiyori et al. | 83/481 X |

Primary Examiner—J. M. Meister
Attorney, Agent, or Firm—Frease & Bishop

[57] ABSTRACT

An adapter ring construction and cooperative arrangement with respect to an arbor for installing tooling on arbors or shafts such as the rotary disc shear knives which are mounted on arbors of slitters for strip metal slitting lines which are operated to continuously slit multiple strands from a wider continuously moving strip such as strip steel. The adapter comprises a ring-like member which is threaded onto a reduced threaded arbor stub shaft of each slitter arbor, after removal of clamping nuts from the stub shafts and retraction of the outboard bearing housing for a pair of cooperating parallel rotary shear knife mounting arbors. The ring-like adapter has a special outer annular contour in cross section which facilitates easy, rapid and damage-free telescoping of rotary shear knives and spacers onto the arbor for a changeover of desired spacing of the rotary knives when the desired strand widths of multiple strands to be slit are changed.

9 Claims, 5 Drawing Figures

ADAPTER CONSTRUCTION FOR ARBOR INSTALLATION OF TOOLING

BACKGROUND OF THE INVENTION

1. Field of the Invention

The invention relates to the construction of a new contoured adapter ring and to its cooperative relation with an exposed end of a rotary tool-receiving arbor when such adapter ring is connected to such arbor end following removal of the bearing support for said arbor end. Such cooperative adapter-arbor assembly facilitates quick, easy and damage-free mounting of tooling on the arbor, particularly when arbor-mounted tooling as used involves very close diametral clearances between the arbor and tooling mounted thereon. Although the improved cooperative adapter-arbor assembly may be used for telescopically installing any kind of tooling on a rotary arbor, the new construction and cooperative arrangement is especially advantageous for use in changing the spacing setup of rotary knives on the rotary arbors of usual strip slitting machines. After the rotary tooling or knives are telescopically mounted on an arbor the adapter ring is removed, the arbor bearing support is replaced, and the tooling is locked on the arbor with a nut threaded onto a threaded arbor stub shaft.

Rotary knives for slitters usually are narrow gauge disc knives and are spaced along the slitter arbors with a predetermined spacing between each pair of knives. The spacing is determined by the width of the narrow strands desired to be slit from a wider, usually steel, strip that is pulled through the rotary slitter stand from an uncoiler to a coiling reel for the multiple strands.

2. Description of the Prior Art

Strip slitting lines for slitting narrow multiple strands from a wider strip, usually strip steel, must be shut down frequently in order to change the setup of spacing between rotary knife pairs on the slitter arbors.

The ends of the two arbors at one end of a slitter are exposed, in changing a knife spacing setup, to axially remove the rotary disc knives and spacers and to then reassemble the disc knives and different length spacers on the arbors. Such a changeover is a difficult and time-consuming operation with prior art slitters because of difficulties presented in telescoping onto an arbor, narrow gauge rotary disc knives which have close diametral clearance with the slitter arbors.

These difficulties involved in telescoping the openings through narrow gauge disc knives over the ends of arbors arise because of the tendency of the discs to cock or tilt out of exact 90° relation with respect to the arbor axis when pressing the discs on an arbor. Any disc knife even slightly tilted when press telescoping the same onto an arbor can become damaged or may damage the end of the arbor to a degree that arbor regrinding or disc knife replacement may be required.

Such arbor regrinding or disc knife replacement, because of the described damage, becomes necessary since such damage may prevent exact desired knife spacing of knife pairs and the rigid mounting of any disc knife from being maintained. Unless exact spacing and rigid knife mounting is maintained, uniform strand widths will not result from the slitting operation.

Accordingly, as stated, prior art knife spacing changeovers are not only time-consuming but also are expensive, involving tedius, slow and careful positioning of the disc knives and maintaining such position to prevent tilting when being pressed onto an arbor. The result is that time-consuming knife spacing changeovers unduly delay slitting line operations, which adds to slitting costs by loss of production.

Some attempts have been made as set forth in Nishiyori et al U.S. Pat. No. 3,800,648 to eliminate long-time shutdowns of slitting lines by providing equipment having a plurality of complete slitter stands each of which is movably mounted on a track system so that the slitter stands may be interchanged, with one complete stand in the slitting line at any one time and the other at an adjacent station for knife setup changeover.

In this manner, the slitting line is not out of operation for a long period of time to accomplish a changeover in the line of knife spacing setup. However, such an arrangement involves the high capital expenditure of at least two rather than one slitter stand, and of the track system, etc. The expensive and time-consuming changeover difficulties still occur with the slitter stand which is out of service when changeover setups thereon are made. Accordingly, this proposal does not satisfy or solve the problem that has existed of eliminating the time-consuming costs of knife spacing changeovers in slitting lines.

Slitter arbors of some prior art slitters have had those arbor ends, which are exposed for disc knife spacing setup changeovers, machined to special contours intended to facilitate telescoping disc knives and spacers onto the arbor ends without damaging the close clearance engaged surfaces. However, in such prior art constructions where the arbor and contour becomes worn or changed from frequent tooling changeovers or where accidental tilting of the disc knives during changeovers damages the arbor or knife, it may be necessary to completely dismantle the arbor from the slitter and replace such arbor with a new arbor or to machine the arbor, to eliminate the damaged surface, to a smaller sized arbor with a new end contour.

These disc knife and arbor maintenance or replacement and time-consuming slitter knife spacing changeover problems have been very costly in the operation of slitting lines. A need has existed for many, many years in the field of slitter operation and arbor or shaft tooling changeover of the general type described, for some means which will eliminate such time-consuming and costly problems. That is, there has been a long existing need, in the art of rotary shaft or arbor tooling changeovers, for a construction and arrangement which facilitates rapid tooling changeovers and which minimizes damage to the arbor and tooling heretofore encountered in the prior art.

SUMMARY OF THE INVENTION

Features of the invention include providing a simple adapter ring with an outer annular contoured portion extending flange-like from an axially extending internally threaded hub, which hub may be screwed onto a threaded stub shaft at one end of a cylindrical slitter arbor, which stub shaft normally receives a locking nut for locking tooling on the arbor; providing such an adapter ring which then threaded onto the stub shaft and engaged tightly against an annular end face of the cylindrical arbor, which end face extends normal to the arbor axis, acts as a pilot to initially loosely enter and then guide a narrow gauge tool or disc knife onto the cylindrical surface of the arbor without tilting the disc knife as the close diametral clearance surfaces of the cylindrical arbor and disc knife are slidably axially engaged; providing such an arbor and adapter ring assembly which prevents damage to the arbor and disc knife when assembling a disc knife on an arbor axially of the arbor, particularly where close diametral clearance must exist and be maintained between the arbor and disc knife when the disc knife is assembled and locked on the arbor and during rotary operation of the arbor; and providing a new construction and arrangement characterized by the foregoing advantageous features which eliminates difficulties and solves problems heretofore encountered in the art.

The new adapter construction for arbor installation of tooling which includes the new features and concepts of the invention comprises a ring-like adapter, generally L-shaped in cross section, having a radially projecting flange portion and an axially projecting hub portion, the hub portion being internally threaded and adapted for removable threaded engagement with the threaded stub shaft extending from an end of a cylindrical metal arbor, which threaded stub shaft normally receives a nut for clamping tooling in operative position on the arbor; the arbor and adapter ring having matching annular ring-like end faces extending in planes normal to the arbor axis when the adapter ring is threadably mounted on the stub shaft with said annular ring-like end faces tightly interface-engaged with each other; the outer surface of the adapter ring flange portion having conical contoured formations thereon, all conical portions of which are diametrally smaller than the diameter of the cylindrical arbor; and the conical portions terminate in a cylindrical portion adjacent the adapter ring annular ring-like end face having a diameter equal to the diameter of the cylindrical arbor; whereby tooling having close diametral clearance characteristics with respect to the cylindrical body of the arbor may be piloted and directed by the adapter ring during telescopic mounting of the tooling on the arbor free of damage to the engaged close clearance surfaces of the tooling and arbor.

BRIEF DESCRIPTION OF THE DRAWINGS

A preferred embodiment of the invention—illustrative of the best mode in which applicant has contemplated applying the principles—is set forth in the following description and shown in the drawings and is particularly and distinctly pointed out and set forth in the appended claims.

Similar numerals refer to similar parts throughout the various figures in the drawings.

DESCRIPTION OF THE PREFERRED EMBODIMENT

Figure 1:
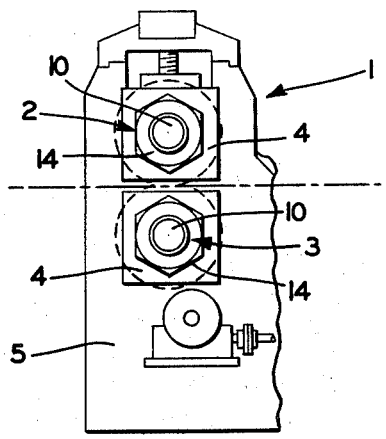
FIG. 1 is a somewhat diagrammatic fragmentary side elevation of an outboard bearing housing for the ends of two arbors of a typical slitter.

Portions of a typical strip metal slitter are indicated generally in FIG. 1 at 1. The slitter may be of the general type shown in the Yoder U.S. Pat. No. 2,335,334. However, the slitter 1 may be any typical slitter manufactured by many different equipment builders.

The slitter 1 includes a pair of horizontal and parallel upper and lower arbors 2 and 3. The ends of arbors 2 and 3 are journaled in typical bearings generally indicated at 4 adjustably mounted in the outboard bearing support member or housing 5 which is movable axially away from the ends of the arbors to a position spaced from the arbor ends as indicated generally in dot-dash lines at 6 in FIG. 2. The bearing support movement is indicated by the arrows 7.

The main body 8 of each arbor 2 and 3 is formed of metal and is cylindrical in shape. The arbor bodies 8 terminate in end faces 9 normal to the arbor axes. Stub shafts 10 threaded at 11 project from the arbor end faces 9. The stub shafts 10 have a reduced portion 12 between the threaded portion 11 and the end face 9 of each arbor body 8. Each cylindrical arbor body 8 may be chamfered at 13 at the annular corner between the cylindrical body 8 and end face 9. Thus, the end face 9 of each arbor body 8 constitutes an annular ring-like surface extending in a plane normal to the axis of the arbor and surrounding the joinder of the reduced stub shaft portion 12 with the arbor body 8.

Figure 2:
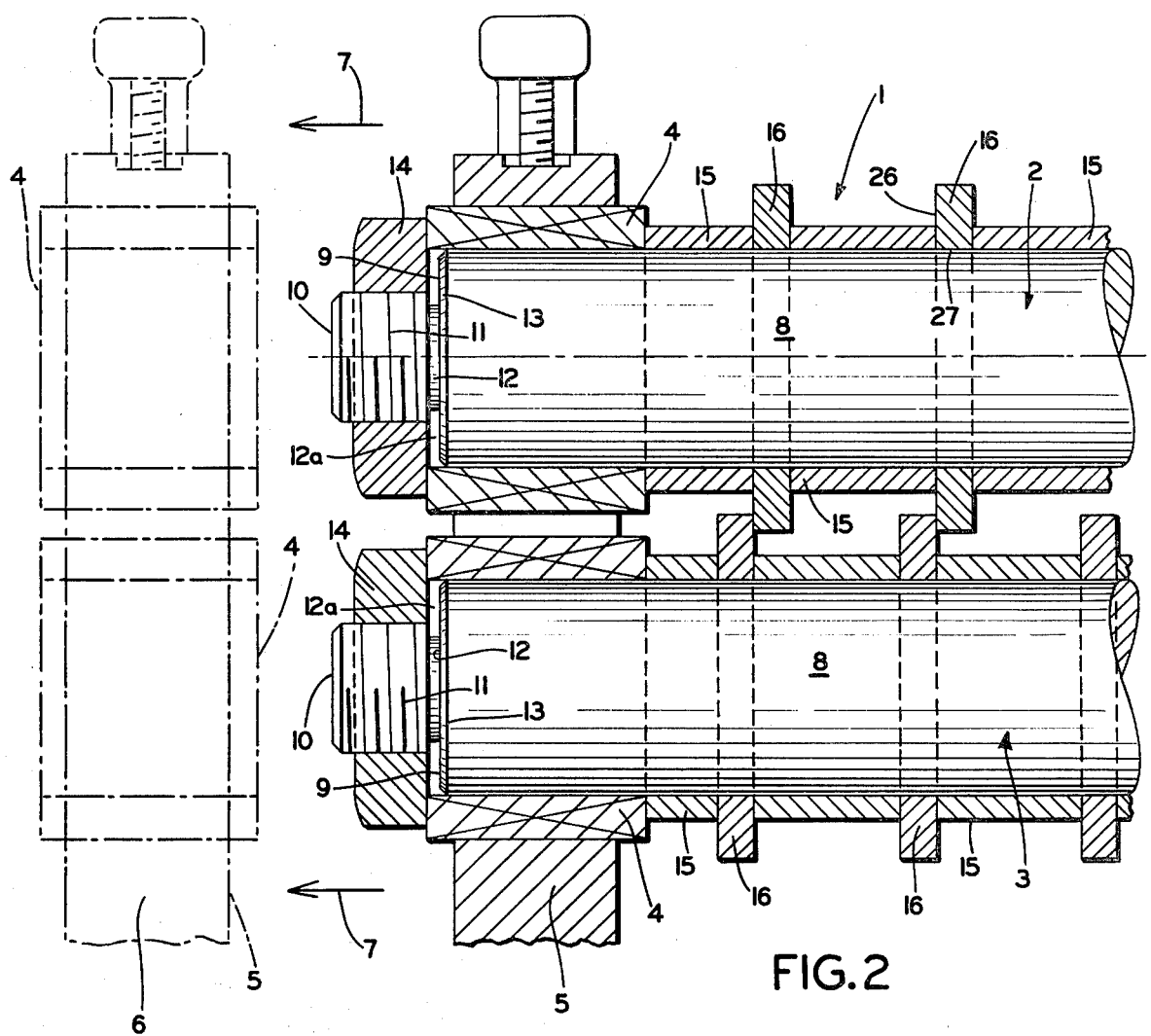
FIG. 2 is an enlarged fragmentary somewhat diagrammatic vertical section of the ends of the pair of slitter arbors shown in FIG. 1 generally illustrating rotary disc shear knives and spacers mounted in pairs on two parallel arbors, with the arbors supported at one end in typical bearings in a movable bearing housing, and with arrows indicating the manner in which the outboard bearing housing may be withdrawn and moved to a position shown in dot-dash lines to permit a tooling changeover.

The slitter 1 in normal slitting line operation (FIG. 2) has arbor bearings 4 that are mounted in the bearing support member 5 locked by the nuts 14 against the spacers 15 and rotary disc shear knives 16 mounted on the arbor bodies 8, the nuts 14 being threaded onto the stub shafts 10. When assembled, there is substantial clearance 12a as shown in FIG. 2 between each nut 14 and the ringlike arbor end face 9.

When it becomes necessary to change the spacing between adjacent disc knives 16, the nuts 14 are removed and the bearing support members 5 with the bearings 4 assembled thereon are moved in the direction of the arrows 7 (FIG. 2) to a location diagrammatically indicated at 6 spaced a sufficient distance away from the ends of the arbors 2 and 3 to permit the spacing setup of the disc knives 16 to be changed.

Figure 3:
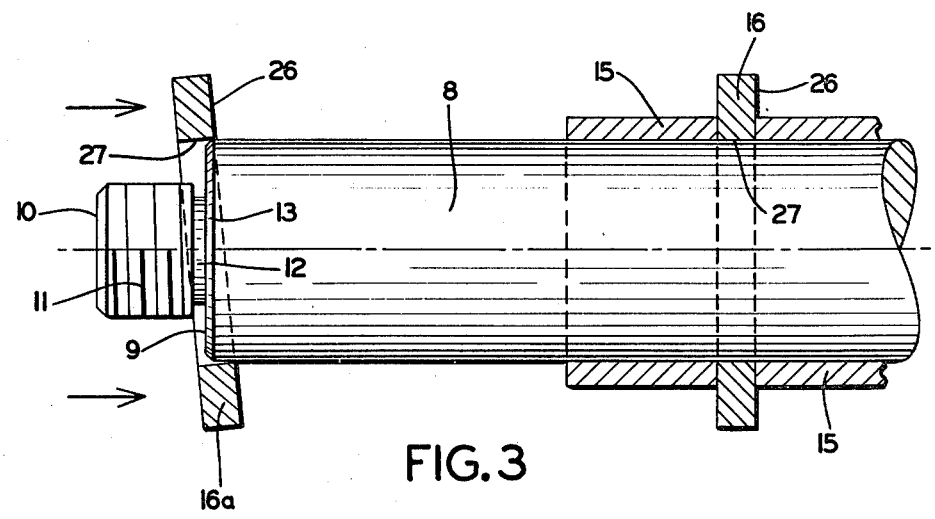
FIG. 3 is a view of one of the arbors of FIG. 2 illustrating an attempt to telescope a rotary disc shear knife onto the end of the arbor, and illustrating cocking or tilting of the disc which frequently occurs in a tooling changeover with prior art equipment.

FIG. 3 illustrates one of the arbors during a spacing setup changeover. After spacers 15 and disc knives 16 have been removed from the arbor body 8 and are being replaced for new spacing, frequently when a disc knife 16a is attempted to be mounted on the arbor body 8, the disc knife may assume a tilted position. The tilting or cocking of the disc knife is illustrated at 16a in FIG. 3 in a manner which frequently occurs during spacing changeover of prior art slitters. This may result in damage to the central opening 27 through the disc knife 16a or to the end portion of the arbor body 8.

This problem inherent in the prior art operation of slitting lines has required very time-consuming handling also may be used for changing the forming rolls on tube mills and other types of roll forming machines.

Having now described the features, discoveries and principles of the invention, the manner in which the new adapter ring construction may be used and incorporated in slitter assemblies, the assembly and operation thereof, and the advantageous, new and useful results obtained; the new and useful features, devices, elements, components, arrangements and parts are set forth in the appended claims.

I claim:

1. A contoured adapter ring, for facilitating arbor installation of disc knife tooling and the like, having integral hub and flange portions; the hub portion having an internally threaded axially extending opening provided at one end with an annular recess; the flange portion projecting radially from the hub portion; an annular ring-like end face formed on the flange portion extending outward from said recess and lying in a plane normal to the axis of the ring; the flange portion having an outer annular contoured surface formed in part by a plurality of differently angled conical surface portions; said contoured surface terminating in a short cylindrical surface portion extending from the conical surface portions to the corner of the flange portion between the contoured surface and said end face; the conical surface portions having differing diameter characteristics, all smaller throughout than the diameter of the cylindrical portion; and the ring being adapted to be threaded onto a threaded stub shaft of an arbor with tight interface engagement of said end face with an arbor body parallel ring-like end face.

2. The adapter ring construction as defined in claim 1 in which the integral hub and flange portions are generally L-shaped in cross section, and in which the hub portion projects axially of the ring axis, and the flange portion projects radially from one end of the hub portion.

3. The adapter ring construction as defined in claim 2 in which said annular recess is located at the end of the hub portion from which the flange portion projects.

4. The adapter ring construction as defined in claim 1 in which the plurality of differently angled conical surface portions of the flange portion contoured surface comprise three conical surface portions the first and third of which taper axially inwardly with respect to the end face; in which the second conical portion is located intermediate the first and third conical portions and tapers axially inwardly toward said end face; and in which said third conical portion is connected with said short cylindrical surface portion.

5. The combination with a rotary tool receiving arbor having a cylindrical arbor body provided at one end with a threaded stub shaft and having an annular ring-like end face at one end of the cylindrical body extending in a plane normal to the axis of the arbor and surrounding the joinder of the stub shaft with the arbor body; of a contoured adapter ring having integral hub and flange portions; the hub portion having an internally threaded axially extending opening provided at one end with an annular recess; the flange portion projecting radially from the hub portion; an annular ring-like end face formed on the flange portion extending outward from said recess and lying in a plane normal to the axis of the ring; the flange portion having an outer annular contoured surface formed in part by a plurality of differently angled conical surface portions; said contoured surface terminating in a short cylindrical surface portion extending from the conical surface portions to the corner of the flange portion between the contoured surface and said end face; the conical surface portions having differing diameter characteristics, all smaller throughout than the diameter of the cylindrical portion; and the ring being threaded onto the arbor stub shaft with the ring end face tightly interface-engaged with said arbor end face; whereby arbor installation of disc knife and spacer tooling and the like onto the cylindrical arbor body is facilitated.

6. The combination as defined in claim 5 in which the cylindrical surface portion of the flange contoured surface has the same diameter as the diameter of the cylindrical arbor body.

7. The combination as defined in claim 6 in which the integral hub and flange portions are generally L-shaped in cross section, and in which the hub portion projects axially of the ring axis, and the flange portion projects radially from one end of the hub portion.

8. The combination as defined in claim 7 in which said annular recess is located at the end of the hub portion from which the flange portion projects.

9. The combination as defined in claim 6 in which the plurality of differently angled conical surface portions of the flange portion contoured surface comprise three conical surface portions the first and third of which taper axially inwardly with respect to the end face; in which the second conical portion is located intermediate the first and third conical portions and tapers axially inwardly toward said end face; and in which said third conical portion is connected with said short cylindrical surface portion.

* * * * * of the arbors, spacers and disc knives of slitters to properly position and hold disc knives in positions normal to or at exactly 90° with respect to the axis of an arbor when telescoping the disc knives onto the arbors during reassembly of the arbor knives.

Figure 4:
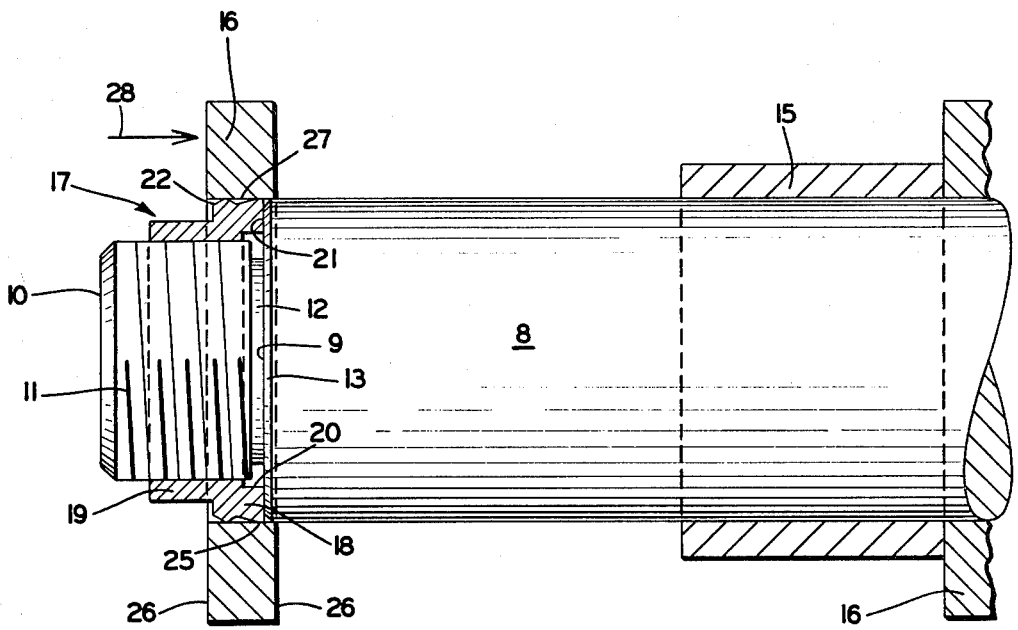
FIG. 4 is a further enlarged diagrammatic view similar to a portion of FIG. 3 illustrating the new construction of adapter ring and its assembled relationship on the end of an arbor to facilitate telescoping of a rotary disc shear knife onto the arbor in a damage free manner.
Figure 5:
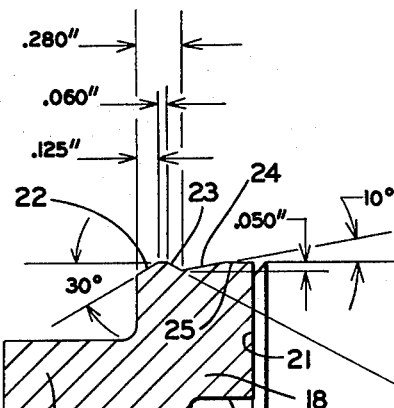
FIG. 5 is a further enlarged view of portions of FIG. 3 illustrating a preferred contour of and cooperative arrangement of a removable adapter ring mounted on the end of the arbor in accordance with the invention.
Figure 5:
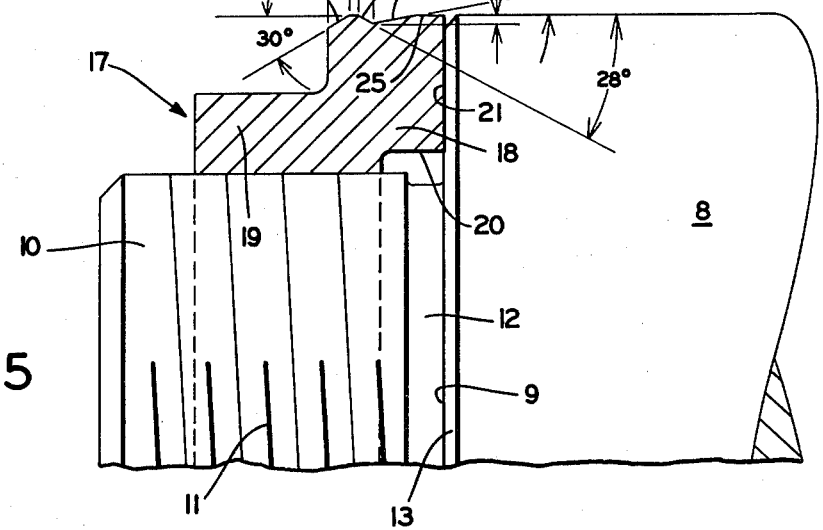

In accordance with the invention, a new adapter ring generally indicated at 17 is provided. The adapter ring 17 preferably is generally L-shaped in cross section as best shown in FIGS. 4 and 5 and has a radially projecting flange portion 18 and an integral axially extending hub portion 19. The hub portion 19 is internally threaded and preferably is longer than the width of the flange portion. The flange end of the hub portion 19 of adapter ring 17 preferably is formed with an internal annular recess 20. The flange portion 18 of the adapter ring 17 has an annular ring-like face 21 extending in a plane normal to the axis of the adapter ring.

The outer annular surface of the adapter ring flange portion 18 has contoured formations thereon including a plurality of conical surfaces, as best shown in FIG. 5, which may comprise the conical portion 22, the reversely directed conical portion 23 and the conical portion 24. The conical portion 24 terminates in a short cylindrical surface portion 25 at the corner of the flange portion 18 between the outer annular contoured surface and the ring-like end face 21.

A preferred construction of the contoured outer annular surface of the adapter ring flange portion 18 is shown in FIG. 5. The cylindrical portion 25 of said contoured flange portion outer surface has a diameter equal to the outer diameter of the arbor body 8. The remainder of the contoured outer annular surface of the adapter ring flange portion 18 is diametrally smaller than the diameter of the arbor body 8. The preferred angular and dimensional characteristics of the contoured adapter ring flange portion surface are shown in FIG. 5.

FIG. 4 illustrates the manner in which the new adapter ring 17 is used. Assume that a new spacing of the knives 16 on one of the arbors 2 is to be changed. During the changeover, the bearing support 5 has been moved to the position 6 of FIG. 2 after removal of the nuts 14. The free end of the arbor body 8 and the threaded stub shaft 10 are exposed. An adapter ring 17 is threaded onto the stub shaft 10 and screwed to a position in which the annular ring-like end face 21 of ring 17 tightly interface-engages the ring-like end face or surface 9 of the arbor body 8 as shown in FIGS. 4 and 5.

When the adapter ring 17 is thus cooperatively assembled with and tightly pressed in interface-engagement with the arbor body 8, the flange portion 18 of the adapter ring and its outer contoured surface provide for piloting the disc knife 16 properly oriented onto the end of the arbor body 8. That is to say, the disc knife 16 is positioned by the adapter ring 17 so that its side surfaces 26 are located exactly at 90° with respect to the arbor axis.

In pilot telescoping the disc knife 16 over the adapter ring 17, those portions of the contoured outer annular surface of the adapter flange portion 18, which are of slightly smaller diameter than the opening 27 through the disc knife 16, readily guide the moving disc knife to and hold it in the required 90° position. Any tendency of the disc knife 16 to tilt or cock is corrected by the conical portions 22, 23 and 24 of the contoured annular adapter surface.

The initial or lefthand (FIGS. 4 and 5) conical surface 22 readily pilots and centers the telescoping of the disc knife opening 27 over the adapter flange portion 18. If during continued movement of the disc knife 16 toward the end of the arbor body 8, any tendency of the knife 16 to tilt is involved, the corner of the opening 27 with the righthand disc surface 26 viewing FIG. 4 will engage the conical portion 24, which has a substantially smaller slope than the conical surface 22, and the conical portion 24 will take over the piloting and guiding functions to properly position the disc knife 16 during continued movement thereof toward the ring-like end face 9 of the arbor body 8.

As the leading righthand end of the central opening 27 in the disc knife 16 reaches the position of FIG. 4, the disc knife 16 will be properly centered and held in position normal with respect to the arbor axis so as to slide readily onto the arbor body 8 as the disc knife 16 is pressed to the right as indicated by the arrow 28 in FIG. 4. This exact centering of the disc knife as it commences to be pressed onto the end of the arbor body 8 is assured because of the guiding function of the cylindrical adapter portion 25 which has the same diameter as the diameter of the arbor body 8.

Accordingly, critical features of the new concept of the invention involve the substitution of the threaded contoured adapter ring 17 for an assembly nut 14; the interface engagement of the tightly clamped ring-like annular surfaces 21 and 9 of the adapter ring 17 and arbor body 8; the recessed portion 20 formed in the adapter ring 17 which permits the engaged end surface interface 21-9 to establish exact alignment of the assembled adapter ring 17 with respect to the arbor; the resultant exact alignment of the cylindrical surface portion 25 of the contoured outer annular surface of the adapter ring flange portion 18 with the cylindrical surface of the arbor body 8; and the coordinated piloting, guiding and centering functions of the conical portions of the contoured adapter ring surfaces.

These relationships and features facilitate knife spacing changeover setups on slitter arbors to be carried out easily, rapidly and free of damage to disc knives, tooling spacers, and arbors during such changeovers. Further, the new adapter ring construction and combined relationship with an arbor, with which the adapter ring may be temporarily assembled in clamped relation, provide a pilot on the arbor stub shaft which initially loosely enters the knife opening and then guides the narrow gauge disc knife onto the arbor without tilting, which is of vital importance where close diametral clearance of engaged surfaces must exist.

Thus, the new adapter ring and its relationship to an arbor achieves the objectives of the present invention, eliminates difficulties that have been encountered in the prior art operation of slitters for many years, and solves problems and obtains the new results described.

In the foregoing description, certain terms have been used for brevity, clearness and understanding, but no unnecessary limitations are to be implied therefrom beyond the requirements of prior art because such terms are used for descriptive purposes and are intended to be broadly construed.

Moreover, the description and illustration of the invention is by way of example with particular respect to slitters, but the concept is applicable generally to tooling changeovers on arbors, and the scope of the invention is not limited to the exact details shown or described. For example, the construction of the invention